US011299885B2

(12) United States Patent
Zheng et al.

(10) Patent No.: US 11,299,885 B2
(45) Date of Patent: Apr. 12, 2022

(54) AEROGEL CONTAINING FOAM BOARD

(71) Applicant: JOHNS MANVILLE, Denver, CO (US)

(72) Inventors: Guodong Zheng, Highlands Ranch, CO (US); Luke S Weith, Littleton, CO (US); Malay Nandi, Littleton, CO (US); Lance Wang, Parker, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 67 days.

(21) Appl. No.: 16/821,769

(22) Filed: Mar. 17, 2020

(65) Prior Publication Data

US 2020/0217068 A1 Jul. 9, 2020

Related U.S. Application Data

(63) Continuation of application No. 15/828,653, filed on Dec. 1, 2017, now Pat. No. 10,633,855.

(51) Int. Cl.
*E04B 2/74* (2006.01)
*B32B 5/18* (2006.01)
*E04B 1/80* (2006.01)
*E04C 2/20* (2006.01)
*E04B 1/74* (2006.01)

(52) U.S. Cl.
CPC .............. *E04B 2/7403* (2013.01); *B32B 5/18* (2013.01); *E04B 1/80* (2013.01); *B32B 2266/0278* (2013.01); *B32B 2266/126* (2016.11); *B32B 2305/022* (2013.01); *B32B 2307/304* (2013.01); *B32B 2307/3065* (2013.01); *E04B 1/803* (2013.01); *E04B 2001/742* (2013.01); *E04B 2103/00* (2013.01); *E04C 2/205* (2013.01)

(58) Field of Classification Search
None
See application file for complete search history.

(56) References Cited

U.S. PATENT DOCUMENTS

| | | |
|---|---|---|
| 6,040,375 A | 3/2000 | Behme et al. |
| 10,611,066 B2 | 4/2020 | Letts et al. |
| 2008/0014435 A1 | 1/2008 | Smith et al. |
| 2014/0128488 A1 | 5/2014 | Lotti et al. |
| 2014/0367033 A1 | 12/2014 | Smith |

*Primary Examiner* — Chinessa T. Golden
(74) *Attorney, Agent, or Firm* — Robert D. Touslee (57) ABSTRACT

An insulative construction product includes a polyurethane foam core and a mixture of Aerogel and carbon black that is disposed within the polyurethane foam core. The mixture of Aerogel and carbon black includes between 90 and 99 weight percent Aerogel and between 1 and 10 weight percent carbon black. The polyurethane foam core includes between 10 and 90 percent by volume of the of Aerogel and carbon black mixture and the construction product has an R-value of at least 8.0 R/inch.

24 Claims, 9 Drawing Sheets

AEROGEL CONTAINING FOAM BOARD

CROSS-REFERENCES TO RELATED APPLICATIONS

This application is a continuation of Non-Provisional U.S. patent application Ser. No. 15/828,653 filed Dec. 1, 2017.

BACKGROUND

Foam based construction boards are often used to insulate commercial and residential structures. The foam based construction boards often include polyurethane or polyisocyanurate foam. These foam boards offer an efficient way to increase the thermal efficiency of an enclosure and are relatively lightweight, non-corrosive, and easy to handle and cut due to their foam construction. Foam boards also offer exceptional flame resistance, smoke spread resistance, and/or mechanical properties making them an excellent choice in insulating most structures.

BRIEF SUMMARY

The embodiments described herein relate to construction boards that include an Aerogel material disposed within the interior of the construction board. According to one aspect, a polyurethane foam based construction product includes a foam core and a mixture of Aerogel and carbon black disposed within the foam core. The foam core includes polyurethane foam and the mixture of Aerogel and carbon black includes between 90 and 99 weight percent of the Aerogel and between 1 and 10 weight percent of the carbon black. The mixture of Aerogel and carbon black is enclosed within a barrier material such that the polyurethane foam does not directly contact the Aerogel and carbon black and the barrier material is entirely surrounded by the polyurethane foam. The construction product has or exhibits an R-value of at least 8.0 per inch, a flame spread index of at most 30, and a smoke development index of at most 300 as measured according to ASTM E-84 test.

The Aerogel and carbon black may be vacuum sealed within the barrier material and/or the barrier material may have a thickness of between 0.2 and 0.4 inches. The foam core may include a ratio of the polyurethane foam to the mixture of Aerogel and carbon black of between 1.5 and 10.5. The construction product may have a thickness of 1 inch. The foam core may include between 10 and 90 percent by volume of the mixture of Aerogel and carbon black. The barrier material may form capsules or pouches and the construction product may include a plurality of such capsules or pouches. In a specific embodiment, the polyurethane foam in the foam core is polyisocyanurate foam.

Accordingly to another aspect, an insulative construction product includes a polyurethane foam core and a mixture of Aerogel and carbon black disposed within the polyurethane foam core. The mixture of Aerogel and carbon black includes between 90 and 99 weight percent of the Aerogel and between 1 and 10 weight percent of the carbon black. The polyurethane foam core include between 10 and 90 percent by volume of the mixture and the construction product has or exhibits an R-value of at least 8.0 R/inch.

The Aerogel may be separated from the polyurethane foam by a barrier material so that the polyurethane foam does not directly contact the Aerogel. In such embodiments, the Aerogel may be enclosed within the barrier material in order to separate the Aerogel from the polyurethane foam. The Aerogel may be vacuum sealed within the barrier material and/or the barrier material may be entirely surrounded by the polyurethane foam. The carbon black may also be enclosed within the barrier material. The barrier material may form capsules or pouches and the construction product may include a plurality of such capsules or pouches. The polyurethane foam core may be made of polyisocyanurate foam. The construction product may include a ratio of polyurethane foam to Aerogel and carbon black of between 1.5 and 10.5.

According to another aspect, a method of forming a construction product includes providing a foam core and positioning a mixture of Aerogel and carbon black within the foam core. The foam core includes polyurethane foam and includes between 10 and 90 percent by volume of the mixture of Aerogel and carbon black. The mixture of Aerogel and carbon black includes between 90 and 99 weight percent of the Aerogel and between 1 and 10 weight percent of the carbon black. The construction product has an R-value of at least 8.0 R/inch, a flame spread index of at most 30, and a smoke development index of at most 300 as measured according to ASTM E-84 test.

The method may also include separating the Aerogel from the polyurethane foam via a barrier material so that the polyurethane foam does not directly contact the Aerogel. In such embodiments, the method may also include enclosing the Aerogel within the barrier material in order to separate the Aerogel from the polyurethane foam. The barrier material may be entirely surrounded by the polyurethane foam when the barrier material is positioned within the foam core. The method may further include enclosing the carbon black within the barrier material and/or vacuum sealing the Aerogel within the barrier material.

The enclosed Aerogel may form a capsule or pouch and in such embodiments, the method may also include positioning a plurality of capsules or pouches within the construction board. In one embodiment, positioning the mixture of Aerogel and carbon black within the foam core includes pouring liquid polyurethane foam around the mixture of Aerogel and carbon black so that the liquid polyurethane foam entirely surrounds the mixture of Aerogel and carbon black. In such embodiment, the method also includes allowing the liquid polyurethane foam to harden. In other embodiments, positioning the mixture of Aerogel and carbon black within the foam core includes positioning the mixture of Aerogel and carbon black between two preformed polyurethane foam boards. In an exemplary embodiment, the polyurethane foam in the foam core is polyisocyanurate foam.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The embodiments described herein relate to construction boards that include an Aerogel material disposed within the interior of the construction board. In one embodiment, the construction boards is a foam board and more particularly a polyurethane based foam board. The Aerogel is encapsulated within the polyurethane foam by encasing the Aerogel within a protective material or envelope. The foam board with encapsulated Aerogel exhibits an R-value that far exceeds those achievable with similarly constructed conventional foam boards. As such, the foam boards described herein are better suited for use in insulating a structure and may be employed in a variety of insulative applications including: insulating residential or commercial buildings or structures; insulating various industrial building, structures, or components; insulating refrigerated trucks, walk-in freezers, navy vessels, ocean liners for oil/LNG shipping, and the like.

Aerogel is a synthetic highly porous and ultralight weight material which is usually made through a sol-gel process. Aerogel is an excellent thermal insulator due to its light weight (i.e., typically 98% air) and extremely small pore size (typically 10-40 nm). The extremely small pore size of the Aerogel greatly enhances the thermal insulation R-value of the resulting construction board. The highly porous Aerogel material greatly minimizes heat or thermal energy transfer due to conduction. The decreased conduction is due to the Aerogel material being mainly composed of a gas or air (i.e., typically 98% air), which is known as an extremely poor heat conducting material. The decreased conduction is also due to the tortuous path created by the highly porous Aerogel material. In the foam based construction boards, the high porosity of the foam material (e.g., a porosity greater than 85% and in some cases greater than 95%) greatly minimizes the heat and thermal energy transfer due to conduction.

The Aerogel material also minimizes heat or thermal energy transfer due to convention due mainly to the extremely small hollow pores in which air or gas is contained. Specifically, the pore size of the Aerogel is equivalent or smaller than the "Mean Free Path" of air (i.e., nitrogen and oxygen) at standard temperature and pressure, which is the average distance that a gas molecule travels between successive collisions with other molecules. The pore size of the Aerogel is around 50 nanometers. The extremely small pore size results in the convective heat or thermal energy transfer being very insignificant and/or negligible.

In closed cell foam construction boards, the pore sizes in the foam material are significantly small and thus, the convective heat or thermal energy transfer through the foam is insubstantial and essentially negligible. A similar result may be realized in open cell foam construction boards when the cell size of the open cell foam is small, such as less than 0.4 mm.

The Aerogel material that is employed in the foam boards can be constructed to minimize heat or thermal energy transfer due to radiation. Radiation heat transfer is not important at low temperature, but it becomes the dominant mode of heat transfer at high temperatures. In some embodiments, a black body material may be mixed with the Aerogel in order to reduce radiation. In a specific embodiment, carbon black granules may be mixed with the Aerogel. In a specific example, the Aerogel may include between 1 and 10 weight percent of the black body material while in other embodiments the Aerogel may include between 2 and 8 weight percent or between 3 and 5 weight percent of the black body material. The black material functions as a blackbody radiator, which greatly minimizes heat or thermal energy transfer due to radiation.

Since the Aerogel material has significant insulative properties, the use of this material in a foam construction board may greatly increase the insulative properties of the board. The foam construction boards described herein exhibit a dramatic increase in R-value in comparison with similarly constructed conventional foam construction boards due to the incorporation of the Aerogel material into the board. For example, the use of the Aerogel materials in the foam construction boards described herein often results in an R-value increase of 2.0 per inch or more. Thus, insulating structures with the foam construction boards described herein may result in a substantial energy usage reduction and corresponding costs savings. These and other advantages will be further realized with reference to the description below of the various embodiments and drawings.

Aerogel Material

Figures 1, 1A:
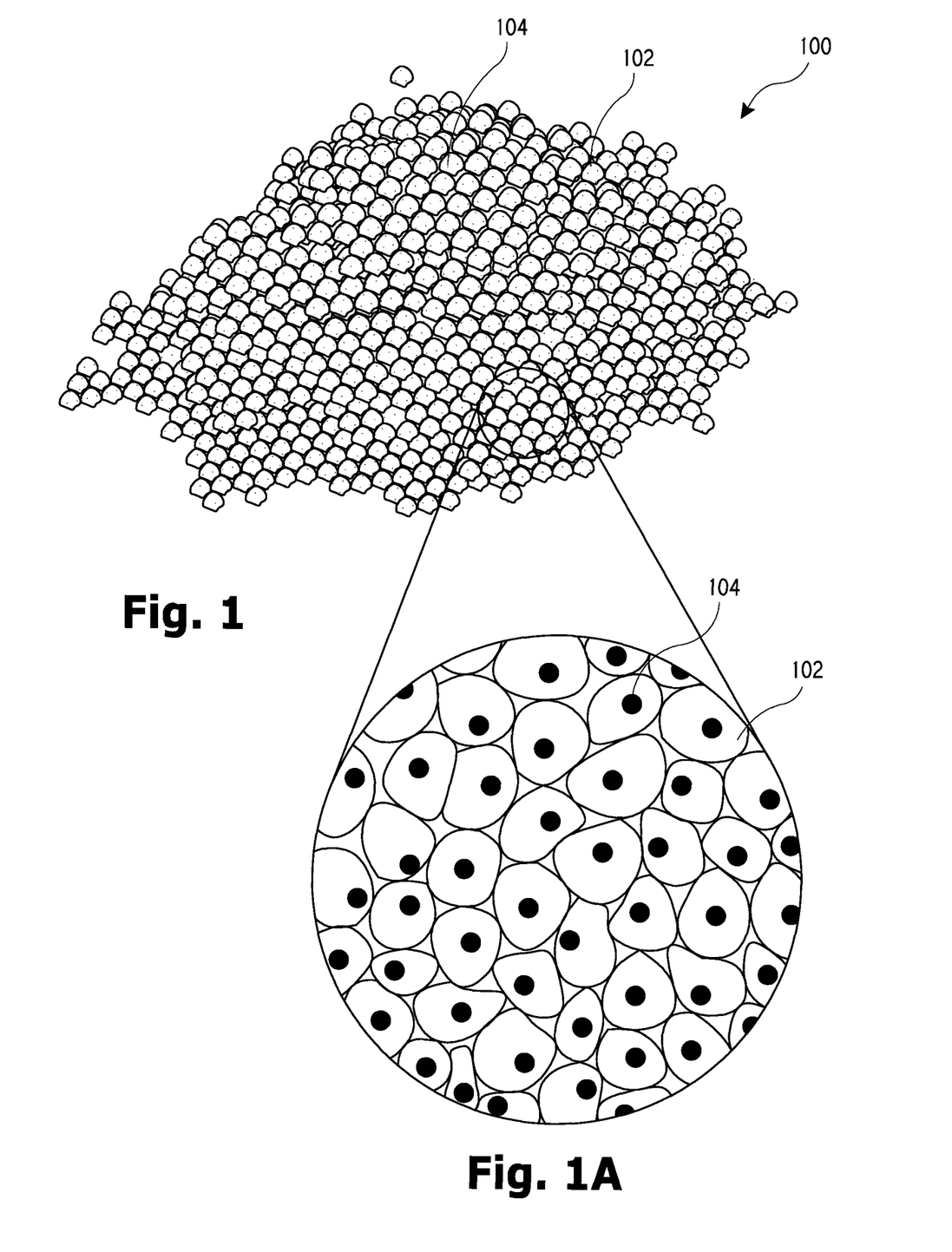
FIG. 1 illustrates an aggregation, mass, or collection of Aerogel particles.
FIG. 1A illustrates an expanded view of a portion of the aggregation, mass, or collection of Aerogel particles of FIG. 1.

Referring now to FIG. 1, illustrated is an aggregation, mass, or collection 100 of Aerogel particles 102. As described above, the Aerogel particles 102 are synthetic highly porous and ultralight weight materials. The Aerogel particles 102 are typically made through a sol-gel process, although any other process of forming the Aerogel particles 102 known in the art may be employed. The Aerogel particles 102 are excellent thermal insulators due to being extremely light weight and low density (i.e., 98% air) and having extremely small pore sizes, which typically are between 10 and 40 nanometers. The nano-sized pores of the Aerogel particles 102 enable the Aerogel particles 102 to exhibit low thermal conductivity by essentially eliminating convection and gas conduction heat or thermal energy transfer. The Aerogel particles 102 are preferably silica Aerogel particles 102, although organic Aerogel materials may be employed such as polyimide and polyurethane aerogel.

FIG. 1A illustrates an expanded view of a portion of the Aerogel material aggregation, mass, or collection 100 and illustrates the individual Aerogel particles 102 in greater detail. As illustrated, the Aerogel particles 102 may be solid blocks or particles, which typically have a particle size or diameter of between 25 and 500 microns, although a particle size of between 50 and 500 microns is more common and a particle size of between 100 to 200 microns is most common. Various other particle sizes for the Aerogel particles may likewise be employed, such as Aerogel particles having a particle size or diameter of up to 3 mm.

FIGS. 1 and 1A also illustrate that in some embodiments, the aggregation, mass, or collection 100 includes a blackbody material 104, which is homogenously or uniformly dispersed within and throughout the Aerogel particles 102. The term "blackbody material" means that the material is a good thermal insulator in regards to radiation and may exhibit characteristics similar to theoretical blackbody radiators. The blackbody material 104 may be added to the Aerogel particles 102 to provide a radiant barrier by impeding and minimizing heat transfer due to thermal radiation.

An exemplary material that may be used as the blackbody material 104 is carbon black (hereinafter carbon black 104). Other materials that may be employed as the blackbody material 104 include iron oxide and titanium dioxide. The carbon black 104 typically has a particle size of less than or equal to 10 μm. The carbon black particles typically agglomerate and thus, the carbon black 104 may be characterized by surface area. The carbon black 104 that is employed in the aggregation, mass, or collection 100 may have a surface area of between 10 $m^2/g$ and 400 $m^2/g$, and more commonly about 78 $m^2/g$. An exemplary carbon black 104 material is Regal® 300 carbon black sold by Cabot Corporation.

Figure 2:
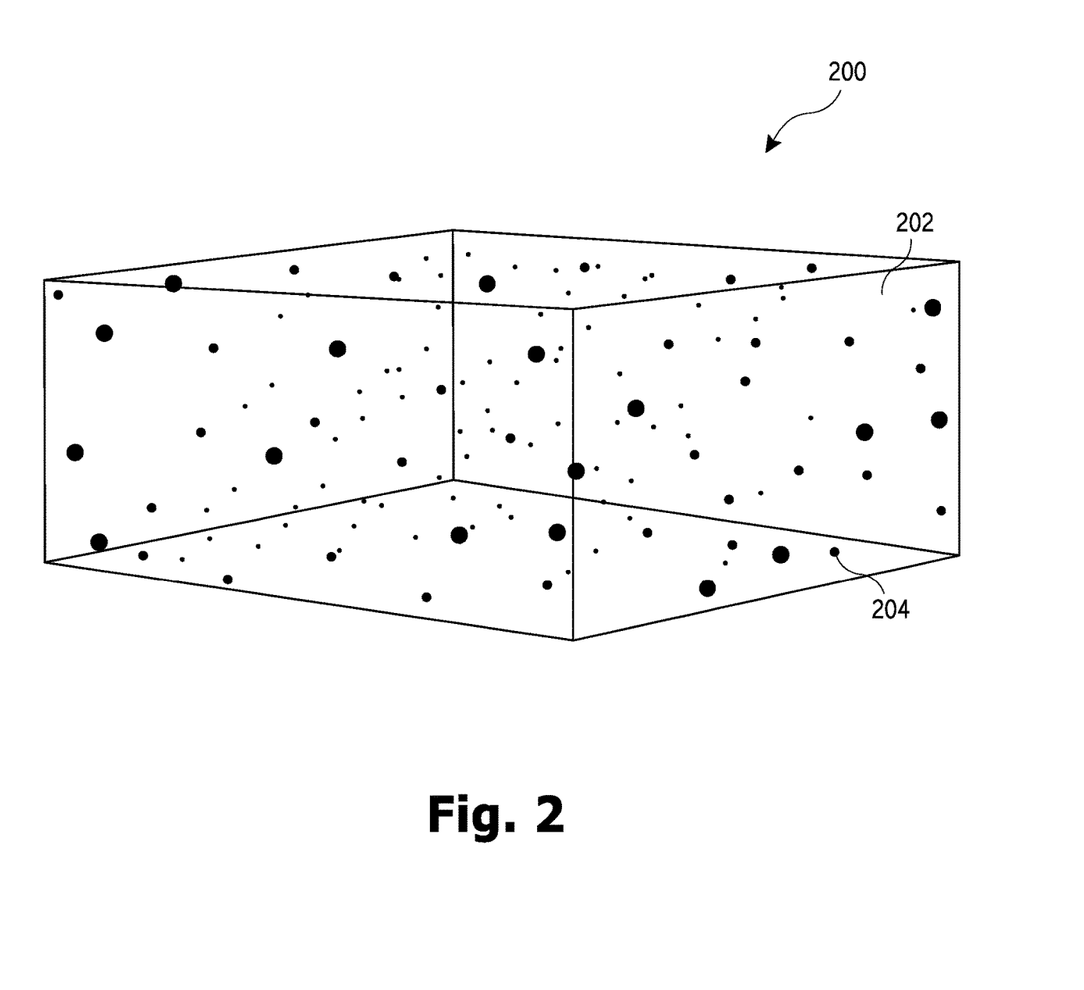
FIG. 2 illustrates a rectangular block of Aerogel material and carbon black embedded within the Aerogel material.

In some embodiment, the aggregation, mass, or collection 100 may only include Aerogel particles 102. In other embodiments, the aggregation, mass, or collection 100 may include a combination of Aerogel particles 102 and carbon black 104. In yet other embodiments, the aggregation, mass, or collection 100 may include other filler materials that are mixed with the Aerogel particles 102 in isolation, or that are mixed with the Aerogel particles 102 and the carbon black 104. When the aggregation, mass, or collection 100 includes a combination of the Aerogel particles 102 and carbon black 104, the aggregation, mass, or collection 100 may include between 90 and 99 weight percent of the Aerogel particles 102 and between 1 and 10 weight percent of the blackbody material 104. In other embodiments, the aggregation, mass, or collection 100 may include between 92 and 98 weight percent of the Aerogel particles 102 and between 2 and 8 weight percent of the blackbody material 104, or between 95 and 97 weight percent of the Aerogel particles 102 and between 3 and 5 weight percent of the blackbody material 104. In some instances, the Aerogel may have a form other than a particle form. For example, FIG. 2 illustrates a rectangular block 200 that includes an Aerogel material 202 and that also includes carbon black 204 embedded within the rectangular block 200 and homogenously or uniformly dispersed throughout the rectangular block 200. In some embodiments, the rectangular block 200 of Aerogel material 202 and/or carbon black 204 may be directly embedded or encased within the foam core of the foam boards described herein.

Although the aggregation, mass, or collection 100 is described as including Aerogel particles 102, in other embodiments the Aerogel particles 102 may be replaced, or used in combination with, other materials that exhibit excellent thermal insulative properties. These other materials may include hydrophobic silica that is fumed and precipitated, titanium oxide materials, and the like. For ease in describing the embodiments herein, the description will focus on the construction boards and/or the aggregation, mass, or collection 100 including Aerogel particles 102. It should be realized, however, that the term "Aerogel particles 102" as used in the description and/or claims may be substituted with a "hydrophobic silica that is fumed and precipitated" and/or with "titanium oxide materials" or other similar materials without departing from the spirit and intent of the invention. For example, the ratios of the Aerogel particles 102 and carbon black 104 in the construction boards and aggregation, mass, or collection 100 represent ratios that may be used for the other insulative materials—i.e., hydrophobic silica that is fumed and precipitated, titanium oxide materials, and the like. In addition, it should be realized that these other materials (e.g., hydrophobic silica that is fumed and precipitated, titanium oxide materials, and the like) may be used in combination with the Aerogel particles 102 and/or carbon black 104 as desired.

Figure 3:
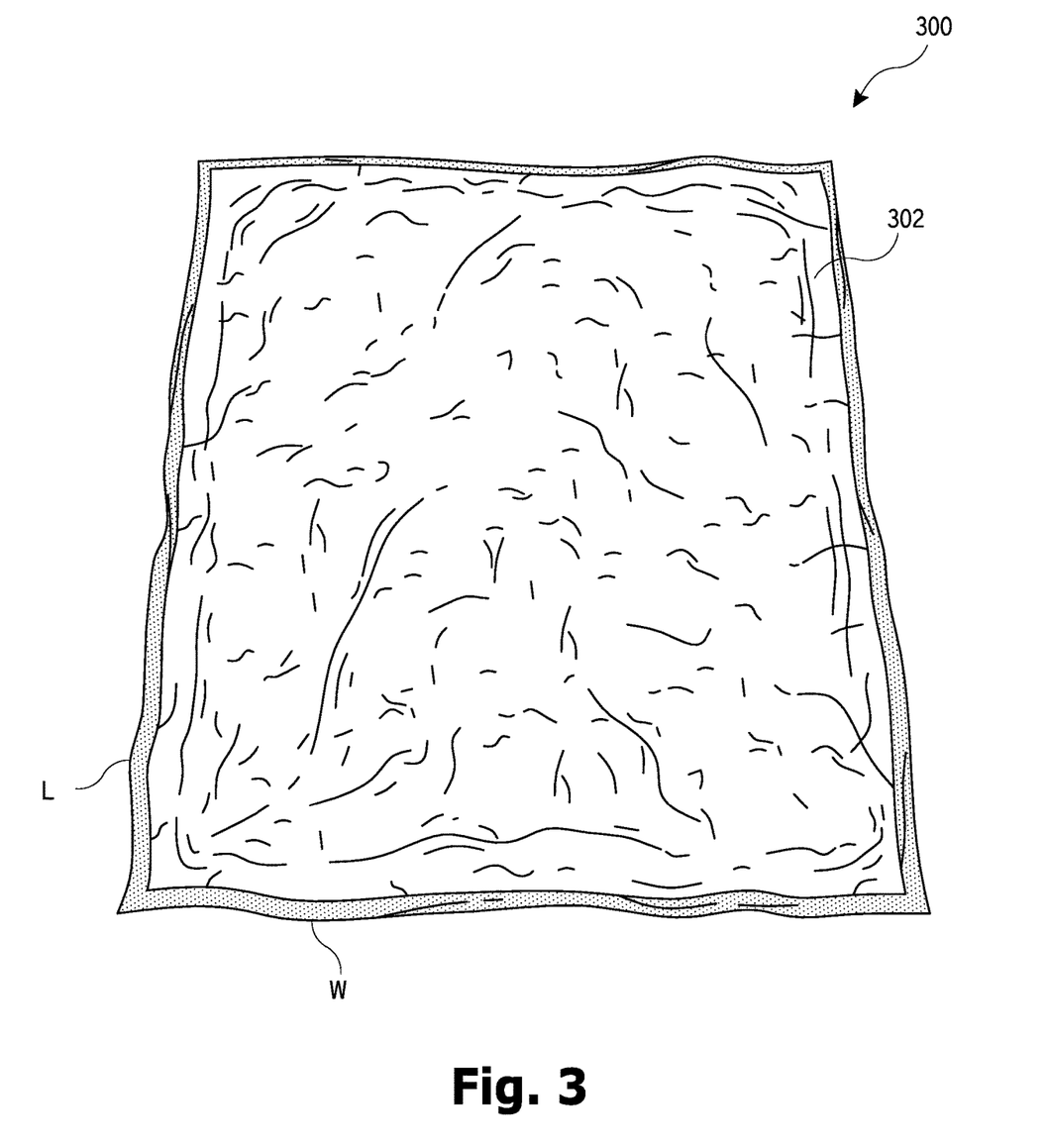
FIG. 3 illustrates a doubled line polymer envelope that may be used to encase and protect Aerogel and carbon black materials.

Aerogel is usually very friable and can be shattered easily. To improve its durability, Aerogel or Aerogel particles have to be protected or embedded in some kind of matrix, such as within a sealed panel. In other embodiments, the Aerogel 102 and the carbon black 104 may be contained or encased within a protective envelope, such as within a doubled line polymer envelope. The doubled line polymer envelope may be airtight and vacuumed sealed to further protect the Aerogel 102 and carbon black 104 and/or to minimize the volume that the material occupies within the foam board. FIG. 3 illustrates an embodiment of a doubled line polymer envelope 300 that may be used to encase and protect the Aerogel 102 and carbon black 104 materials. The Aerogel 102 and carbon black 104 are disposed within an interior 302 of the doubled line polymer envelope 300. The doubled line polymer envelope 300 may be rectangular in shaped having a length L, a width W, and a thickness T, which may be selected based on the application in which the doubled line polymer envelope 300 will be used. Common values for the length L include between 1 and 24 inches, although between 3 and 20 inches is more common, and between 4 and 15 inches is most common. Common values for the width W include between 1 and 24 inches, although between 3 and 20 inches is more common, and between 4 and 15 inches is most common. Common values for the thickness T include between 0.1 and 1.0 inches, although a thickness of between 0.2 and 0.8 inches is more commonly, and a thickness of between 0.3 and 0.6 inches is most common. In a specific embodiment, the doubled line polymer envelope 300 has a length L of approximately 6 inches, a width W of 4 inches, and a thickness T of between 0.3 and 0.6 inches. Although the doubled line polymer envelope 300 is illustrated in FIG. 3, it should be realized that a wide variety of different shaped envelopes or enclosures may be used to encase and protect the Aerogel 102 and carbon black 104 materials. These different shaped envelopes or enclosures may have any of the length, width, and/or thickness values described above.

The doubled line polymer envelope 300 may be vacuumed to remove air or gases from within its interior. Removal of air or other gases may minimize conductive and/or convective heat or thermal energy transfer through the doubled line polymer envelope 300. The doubled line polymer envelope 300, or any other envelope or enclosure described herein, may maintain the Aerogel 102 and carbon black 104 in a homogenously or uniformly mixed state. An exemplary embodiment of a vacuum sealed polymer envelope is the Aerogel Compression Pack™ product sold by Johns Manville. The R value for the Aerogel Compression Pack™ may be approximately 9.5 R at 75° F., which value may be used for any of the polymer envelopes or Aerogel containing materials described herein.

One or more other materials may be mixed or combined with the Aerogel in the polymer envelope 300. The materials that may be mixed or combined with the Aerogel include expanded perlite, precipitated silica, calcium carbonate, talc, mag hydroxide, and the like. The use of these materials may have a negative effect on the R-value of the resulting construction board, but may provide other advantageous properties, such as lower manufacturing costs and the like.

Foam Construction Board

Figure 4:
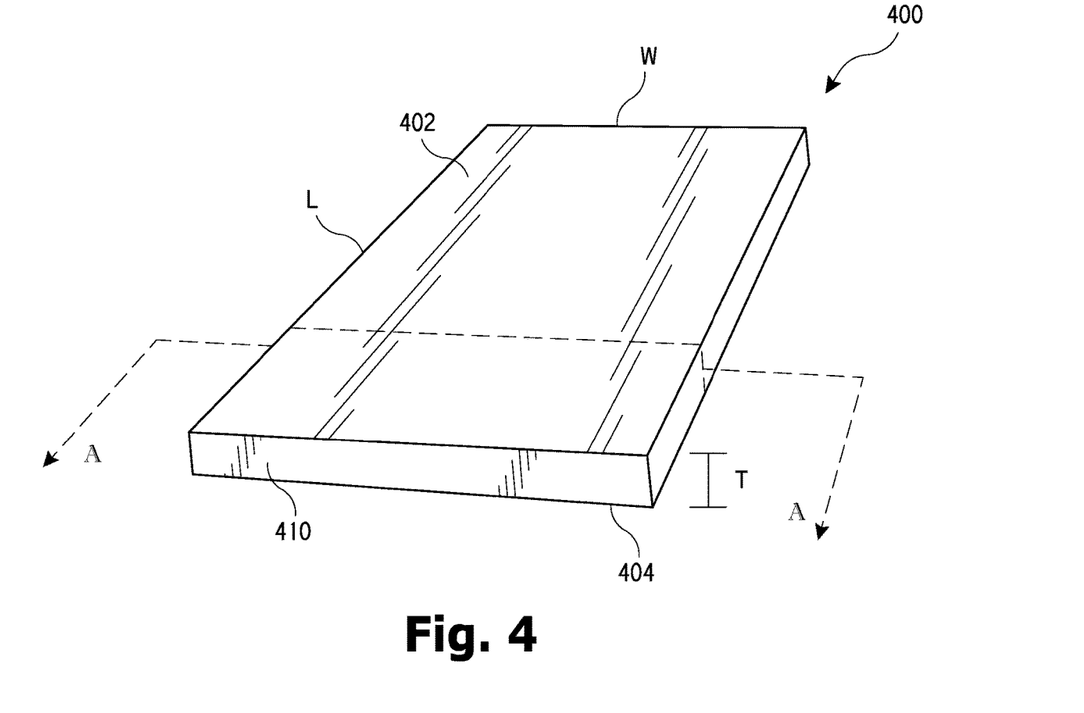
FIG. 4 illustrates a foam construction product that includes an Aerogel material positioned within a foam core of the foam construction product.

Referring to FIG. 4, illustrated is a foam construction product or board 400 (hereinafter foam board 400) that includes the Aerogel 102 material positioned, encased, or otherwise disposed within a foam core 410 of the foam board 400. The Aerogel 102 material is typically disposed within an encasing envelope (hereinafter polymer envelope 310) that typically includes carbon black 104 in addition to the Aerogel 102 as previously described. The encasing envelope may be similar to the doubled line polymer envelope 300 of FIG. 3 (i.e., the Compression Pack™) or any other encasing envelope, such as those illustrated in FIGS. 5A-8B. The foam board 400 exhibits improved insulative properties in comparison with conventional foam construction boards. The foam core 410 of the foam board 400 is typically a polyurethane foam. The term "polyurethane" as used herein includes non-crosslinked polyurethanes and crosslinked polyurethanes (for example, polyisocyanurate). Unless specifically recited in the claims, the description of polyurethane may refer to both polyurethane and polyisocyanurate products.

In many embodiments, the foam board includes a polyisocyanurate foam. In some embodiments, the polyisocyanurate foam may be a polyurethane modified polyisocyanurate due to the presence of urethane/urea linkages in the foam. Exemplary polyfunctional isocyanates that may form substituted or unsubstituted polyisocyanates that are used to make the polyisocyanurate foam boards and other foam products include aromatic, aliphatic, and cycloaliphatic polyisocyanates having at least two isocyanate functional groups. Exemplary aromatic polyfunctional isocyanates include: 4,4'-diphenylmethane diisocyanate (MDI), polymeric MDI (PMDI), toluene disisocyanate, and allophanate modified isocyanate. For example, the polyfunctional isocyanate may be PMDI with functionality between 2.3 to 3.0, viscosity less at 800 cps at 25, and isocyanate content between 28% to 35%.

The polyfunctional isocyanates may be reacted with a polyfunctional co-reactant that has at least two reactive groups that react with the polyfunctional isocyanate to produce a polyisocyanurate compounds for the present products. Exemplary polyfunctional co-reactants may include polyester and polyether polyols having at least 2 isocyanate reactive groups, such as hydroxyl groups. Specific examples include aromatic polyester polyols which have good mechanical properties, as well as hydrolytic and thermo-oxidative stability. Commercially available polyester polyol include those sold by Stepan Company under the name Stepanol® and those sold by Huntsman Corporation under the name of Terol®. Exemplary polyols may have a functionality between 2 and 2.5 and hydroxyl number between 150 mg KOH/gm and 450 mg KOH/gm.

The catalysts used to polymerize the polyisocyanurates may include amine catalysts and metal catalysts, among other catalysts. The amine catalysts catalyze both urethane reactions between isocyanates and polyols, and urea reactions between water and isocyanates. The metal catalysts may include metal carbon/late trimer catalysts, which promote the conversion of isocyanate to highly thermally stable isocyanurate ring. Examples of suitable amine catalysts include pentamethyldiethylenetriamine (PMDETA), dimethylcyclohexylamine, and 1,3,5-tris(3-(dimethylamino) propyl)-hexahydro-triazine. Examples of suitable metal catalysts include potassium octoate and potassium acetate.

The present polyisocyanurate formulations may also include one or more surfactants. The surfactants function to improve compatibility of the formulation components and stabilize the cell structure during foaming. Exemplary surfactants can include organic or silicone based materials. Typical silicone based surfactants may include polyether modified polysiloxane, such as commercially available DC193 surfactant from AirProducts, and Tergostab® series surfactants from Evonik, such as Tergostab® 8535.

The foam board 400 is typically a rectangular board having a length L, a width W, and a thickness T, which may be selected based on the application in which the foam construction board 400 will be used. A common value for the length L is 8 feet, whereas a common value for the width W is about 4 feet, and a common value for the thickness T is between 0.5 and 4.5 inches. The foam board 400 may likewise have a material density or weight of between 1.5 and 10 lbs per cubic foot (pcf), and more commonly between 2 and 8 pcf, and most commonly between 2.5 and 6 pcf.

The foam board 400 has a first face 402 and a second face 404 that is positioned opposite the first face 402. In some embodiments, the first face 402 and/or second face 404 include a facer material that may be attached to the respective face to provide an aesthetic appearance or that may provide a desire property or characteristic, such as increased smoothness, texture, and the like. In other embodiments, the first face 402 and/or the second face 404 may be free of a facer material, or may include a material coating as desired.

Figure 4A:
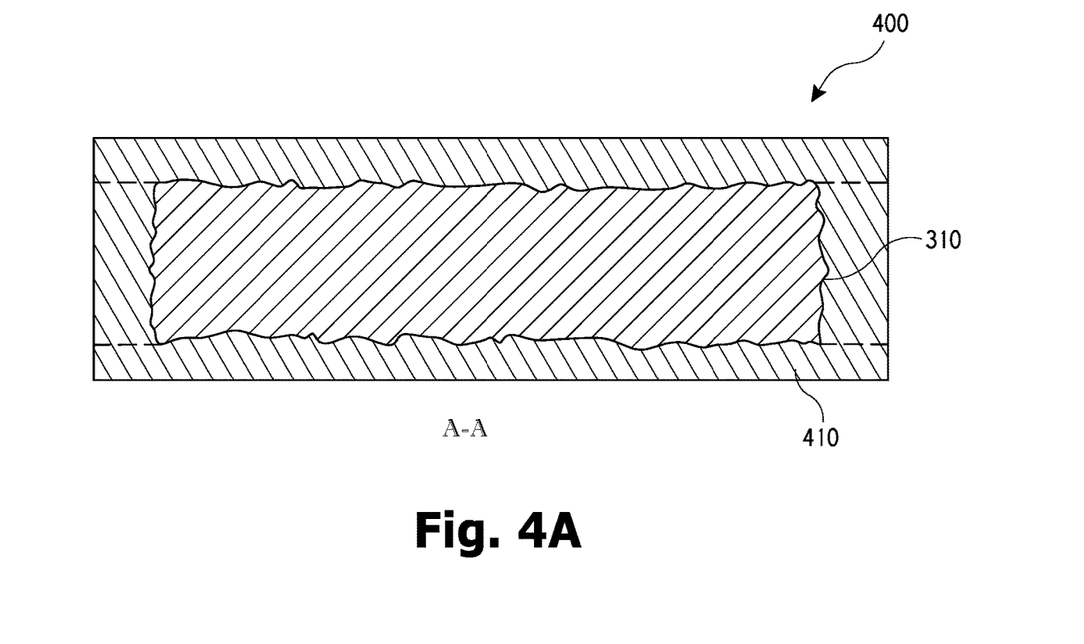
FIG. 4A illustrates a cross-section of the foam construction product of FIG. 4.

FIG. 4A illustrates a cross-section of the foam board 400 taken along line A-A. As illustrated, the foam board 400 includes a foam core 410 that is commonly made of polyurethane foam and more commonly polyisocyanurate foam. A mixture of Aerogel is embedded, disposed, or otherwise positioned within the interior of the foam core 410 such that the Aerogel is entirely enclosed or encased within the foam core 410. The Aerogel material is commonly mixed with carbon black as previously described. The foam core 410 may include between 10 and 90 percent by volume of the Aerogel material or the mixture of the Aerogel material and carbon black. In other embodiments, the foam core 410 may include between 30 and 90 percent by volume of the Aerogel material/Aerogel and carbon black mixture or between 50 and 90 percent by volume of the Aerogel material/Aerogel and carbon black mixture.

In the illustrated embodiment, the Aerogel and carbon black are enclosed within a barrier material—i.e., the polymer envelope 310. The polymer envelope 310 provides a barrier between the foam core 410 and the Aerogel and carbon black such that the foam (e.g., polyurethane/polyisocyanurate foam) does not directly contact the Aerogel and carbon black. The polymer envelope 310 is entirely surrounded by the foam material of the foam core 410 so that the polymer envelope 310 is fully encased or enclosed within the foam core 410.

The barrier between the foam material of the foam core 410 and the Aerogel material is important because if the Aerogel is mixed with the foam material, the foam material may penetrate into the pores of the Aerogel and thereby negate the desired thermal insulative properties of the Aerogel particles 102. For example, if the foam material were able to penetrate into the pores of the Aerogel particles 102, the Aerogel particles 102 would exhibit heat or thermal energy transfer properties more in line with solid materials, which would significantly degrade the beneficial conductive and convective insulative properties of the Aerogel particles described above. A foam construction board that is constructed with the foam material penetrating into the pores of the Aerogel material may exhibit negligible difference in thermal insulative properties in comparison with similar foam boards that do not include an Aerogel material.

In the embodiment of FIG. 4A, the polymer envelope 310 (e.g., a Compression Pack™) functions to protect the Aerogel material from the foam material by physically separating the Aerogel and foam materials. Since the Aerogel material is physically separated from the foam material, the Aerogel material is protected from the foam material penetrating into the pores of the Aerogel material and thus, the insulative properties of the Aerogel are not degraded by the foam.

As previously described, the polymer envelope 310 may be vacuumed so that the air or gas within the polymer envelope 310 is substantially removed. The use of a vacuumed polymer envelope 310 may result in an R-value for the foam board 400 that is significantly higher than a similar foam board that employs a non-vacuumed polymer envelope 310. The increase in R-value may be due to the removal of gas molecules from the polymer envelope 310, which may reduce the conduction between gas molecules in the polymer envelope 310. When the polymer envelope 310 is not vacuum packed, it may be difficult to position the polymer envelope within relatively thin foam boards (i.e., boards with a thickness T of 1-1.5 inches or less) due to the thickness of non-vacuum pack polymer envelope 310. Applying a vacuum to the polymer envelope 310 greatly reduces the thickness of the polymer envelope 310, thereby enabling the polymer envelope 310 to be more easily positioned within the interior of relatively thin foam boards 400. In some instances, the thickness of the polymer envelope 310 may decrease by ¼ of an inch or more, such as from approximately 0.5 inches to 0.25-0.30 inches. The thinner polymer envelope 310 typically results in a thicker foam material wall on opposing sides of the polymer envelope 310, which may increase the overall R-value of the foam board.

After the foam material of the foam core 410 hardens, the foam may maintain the polymer envelope 310 in a compressed state even if the polymer envelope 310 is inadvertently or purposefully punctured. As such, the hardened foam of the foam core 410 may prevent the polymer envelope 310 from expanding within the foam core 410 and damaging and/or deforming the foam board 400. Accordingly, maintaining the integrity of the vacuum seal is not required after the foam board 400 is constructed in order to maintain the insulative properties of the foam board 400.

In contrast to some conventional foam/insulative boards, puncturing the polymer envelope 310, or otherwise damaging or negating the vacuum seal, will not significantly affect the R-value of the foam board 400. For example, some conventional foam/insulative boards include a vacuum panel or liner that is disposed within the interior of the foam/insulative board. The R-value of these foam/insulative boards is entirely dependent on the integrity of the vacuum seal since these vacuum panels or liners rely on a vacuum or air free environment to provide the desired insulative properties. Once the vacuum seal of these vacuum panels or liners is broken or compromised, the vacuum or air free environment is lost and the desired insulative properties are severely diminished or eliminated, which results in a dramatic increase in R-value of the foam/insulative boards. In contrast, the foam boards described herein are not negatively impacted due to puncture, breakage, or otherwise compromise of the polymer envelope's seal since the polymer envelope 310 does not rely solely on a vacuum or air free environment to provide the desired insulative properties. Rather, the insulative properties of the polymer envelope 310 are due to the inclusion of the Aerogel and/or carbon black material, which do not require or depend on a vacuum or air free environment. As such, even if some reduction in R-value is experienced after the vacuum seal of the polymer envelope 310 is lost, the R-value of the foam board 400 is substantially maintained due to the presence of the Aerogel and/or carbon black material.

In some instances, the vacuumed polymer envelope 310 may be encased and/or enclosed within the foam board 400 by pouring the foam material around the polymer envelope 310 and allowing the foam material to expand and flow around the polymer envelope 310. In other embodiments, the bottom layer of the foam board 400 may be formed or constructed and a recess or cutout could be formed in the bottom layer. The formed recess could correspond in shape and size to the polymer envelope 310. The bottom layer and recess may be formed by pouring the foam atop a mold or by pouring the foam atop the polymer envelope 310 on a flat or planar surface. The polymer envelope 310 may then be positioned within the recess and a top layer may be formed atop the bottom layer so that the polymer envelope 310 is encased and enclosed between the bottom layer and the top layer. In other embodiments, the foam board 400 may be constructed of a preformed bottom member, top member, and side members that are each independently formed and then bonded, coupled, or otherwise fastened together with the polymer envelope 310 disposed in the interior of the foam board 400. The dashed lines in FIG. 4A represents the individual preformed members of the foam board 400 that may be coupled together. The dashed lines in FIG. 4A may also represent a top layer or member that is attached to a bottom layer or member with a recess formed therein for the polymer envelope 310.

In some instances, a ratio of the volume of the foam material in the foam core 410 to the volume of the Aerogel (e.g., polymer envelope 310) in the foam core 410 may be important to achieving or maintaining a desired R-value for the foam board 400. The foam material to Aerogel volume ratio determines the percentage of Aerogel material that is present in the foam encapsulated Aerogel composite. Lower ratios of foam material to Aerogel material result in increased R-values due to the increased presence of Aerogel. In some embodiments, the ratio of foam material to Aerogel (or Aerogel and carbon black) is between 1.5 and 10.5, although a ratio of between 3 and 9 is more commonly, and between 5 and 8 is most common. In a specific embodiment, the ratio of foam material to Aerogel (or Aerogel and carbon black) is about 6.5. The foam board 400 typically has an R-value of at least 7.0 per inch and more commonly at least 8.0 per inch. In some embodiments, the foam board 400 may have an R-value of up to 20.0 per inch. This R-value represents a substantial increase over the R-values of conventional foam insulation boards.

The Aerogel and foam material may work synergistically to deliver an R-value that is higher than what would be anticipated for the combination of the two elements. For example, since the two components are combined, the thermal performance of the composite insulation material should be a volume weighted average R-value of the separate components. A 1 inch composite insulation product having a ratio of foam material to Aerogel of 6.5 would comprise approximately 14 volume percent Aerogel and 86 volume percent foam. An Aerogel material (e.g., Compression Pack) having an R-value of 9.5 R/in and a foam material having an R-value of 6.5 R/in would be expected to have a volume weighted average R-value average of 7 R/in (i.e., 9.5 R/in*0.14+6.5 R/in*0.86 is approximately 7 R/in). In contrast to this expected result, however, a 1 inch composite insulation product having a ratio of foam material to Aerogel of 6.5 was manufactured and exhibited an R-value of approximately 8.5 R/in. The 8.5 R/in exhibited an R-value increase of 1.5 R/in over the expected result, which may be due to a synergistic effect that is achieved when the material are combined.

The foam core 410 also includes a fire retardant and/or smoke retardant material that enables the foam board 400 to exhibit a flame spread index of no greater than 30 and a smoke development index of no greater than 300 as measured according to ASTM E-84 test. The fire retardant that is used within the foam core 410 may be selected from a variety of fire retardants including halogenated fire retardants (e.g., Tris(chloroisopropyl) phosphate (TCPP)), PHT-4Diol™ by Great Lakes Solutions, LLC, SaFRon® 6605 made by ICL Industrial Products, non-halogenated fire retardants (e.g., diethyl hydroxymethyl phosphonate (DEHMP)), triethyl phosphate (TEP), and inorganic materials such as aluminum trihydroxide, magnesium dihydroxide, molybdenum oxide, and the like.

In regards to the flame spread index and the smoke development index, the ASTM E-84 (i.e., ASTM E-84-17) tunnel test is a common fire test that is required for plastic foam insulation boards used in either wall or roof insulation systems. The test requires removing any facer products from the insulation boards and measuring the flame spread and smoke density that is generated by the foam core in response to exposure to a flame.

Figure 5A:
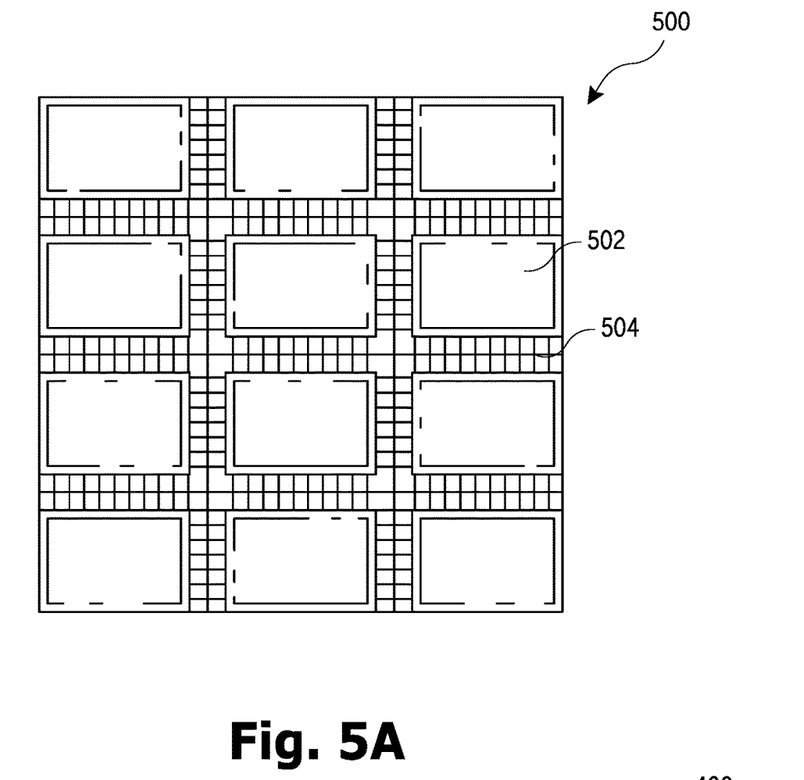
FIG. 5A illustrates an Aerogel blanket/sheet.

FIGS. 5A-8B illustrate embodiments in which alternative envelopes or enclosures are used for the Aerogel material or the mixture of the Aerogel material and carbon black. FIG. 5A illustrates an Aerogel blanket or sheet 500 that may be used in place of, or in addition to, the polymer envelope 310. The Aerogel sheet 500 includes a main body 504 and a plurality of individual polymer packets or envelopes 502 that are positioned within the main body 504 and that are uniformly or evenly spaced apart. Each of the polymer packets 502 includes Aerogel material or a mixture of Aerogel and carbon black as described herein. Each of the polymer packets 502 may likewise be vacuum sealed. The main body 504 may be formed of a polymer material sheet and/or polymer threads. The main body 504 is typically porous to enable foam material to penetrate through the main body 504 and flow around the packets 502.

Figure 5B:
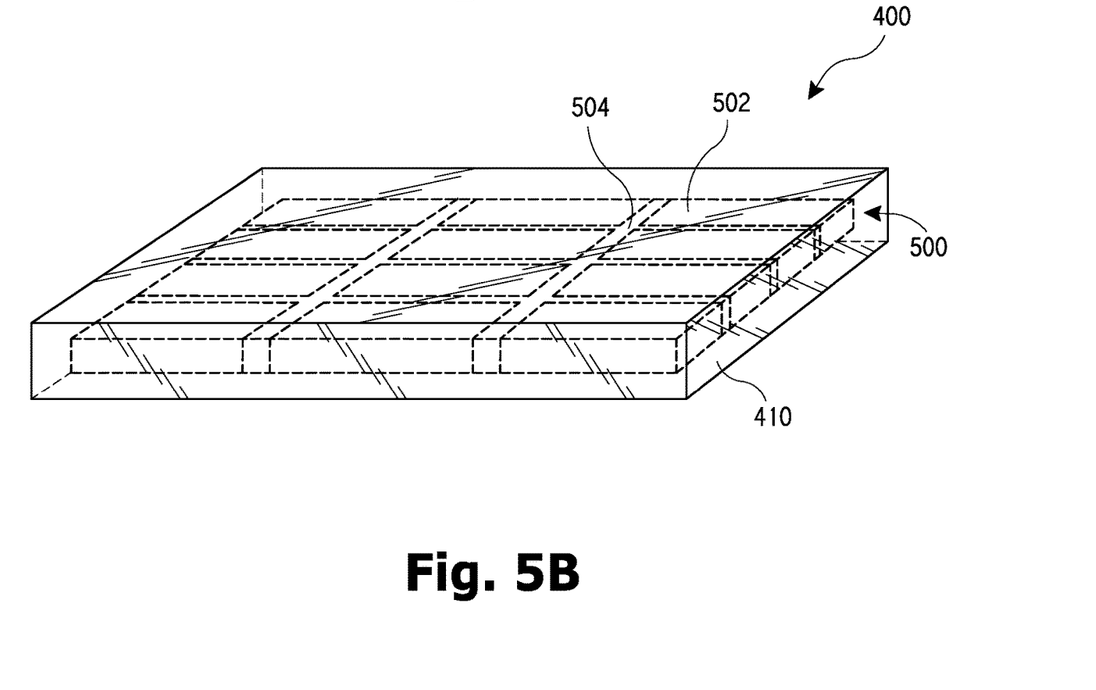
FIG. 5B illustrates the Aerogel blanket/sheet of FIG. 5A disposed within a foam core of a foam construction product.

FIG. 5B illustrates the Aerogel sheet 500 disposed within the foam core 410 of the foam board 400. The use of the porous main body 504 may enable the foam material of the foam core 410 to easily flow around and between the individual polymer packets 502 during formation of the foam board 400. The polymer packets 502 function as a barrier between the foam material and the Aerogel material as described herein. The foam board 400 may have an R value per inch of at least 8.0 or at least 8.5. The foam board 400 may have a ratio of foam material to Aerogel (or Aerogel and carbon black) of between 5 and 8, and commonly about 6.5.

Figure 6A:
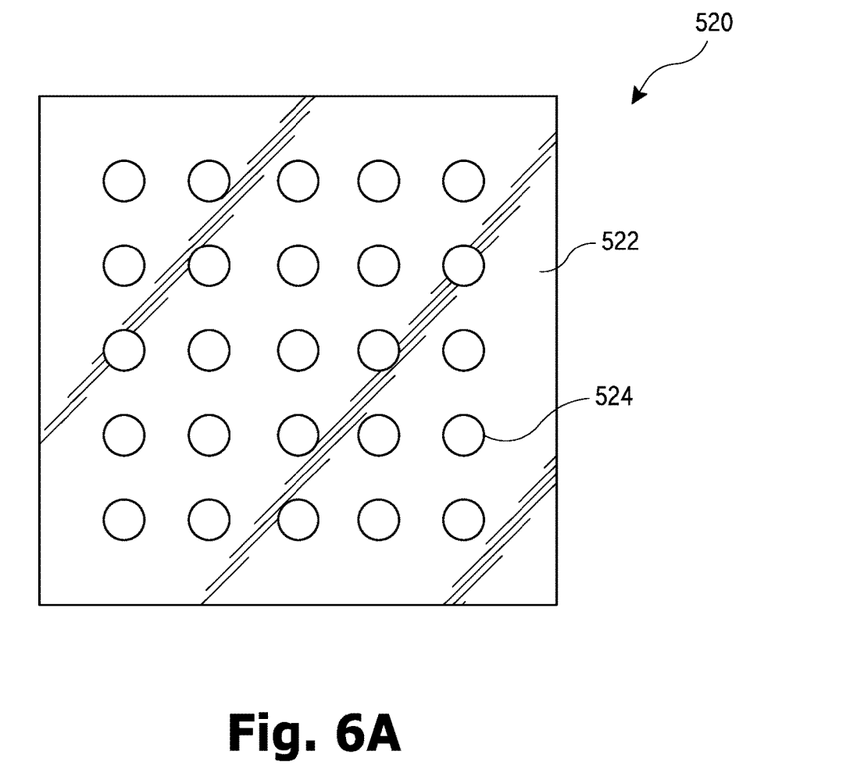
FIG. 6A illustrates an Aerogel sheet.

FIG. 6A illustrates an Aerogel sheet 520 that includes a solitary main body 522 similar to that of the polymer envelope 310. The main body 522 includes a plurality of apertures or through holes 524 that are uniformly spaced and distributed throughout the main body 522. The main body 522 includes Aerogel material or a mixture of Aerogel and carbon black as described herein and may be vacuum sealed. The through holes 524 are constructed so that they do not compromise any vacuum seal and so that the Aerogel material is not able to leak or fall out of the main body 522. The main body 522 may be formed of a polymer material or any other similar material. The through holes 524 of the main body 522 enable foam material to penetrate through the main body 522 and flow around the main body 522.

Figure 6B:
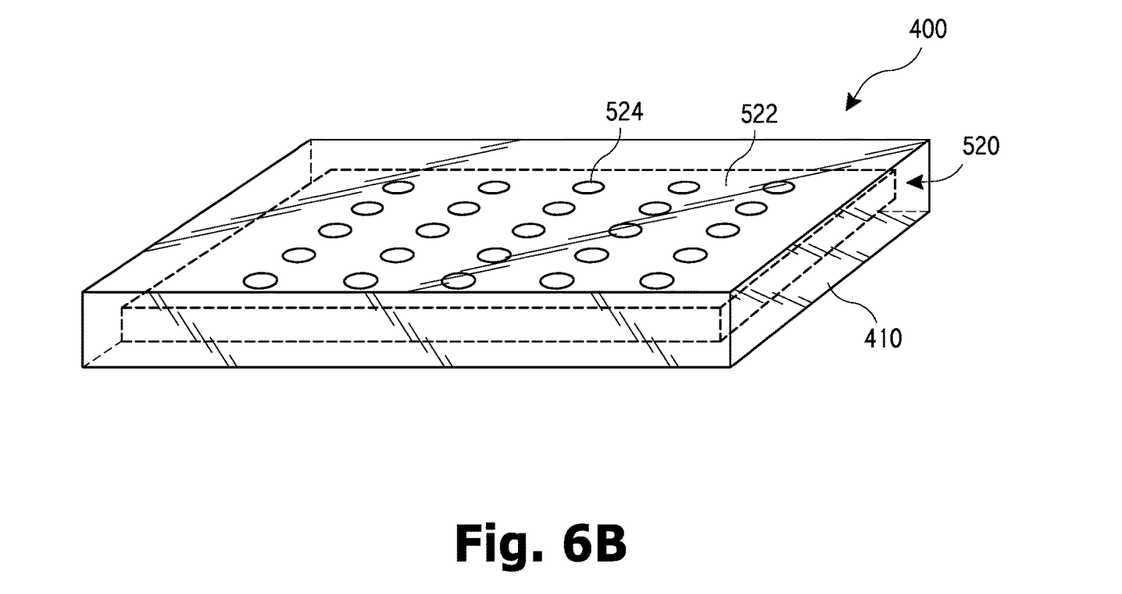
FIG. 6B illustrates the Aerogel sheet of FIG. 6A disposed within a foam core of a foam construction product.

FIG. 6B illustrates the Aerogel sheet 520 disposed within the foam core 410 of the foam board 400. The use of the through holes 523 enables the foam material of the foam core 410 to easily flow through and around the main body 522 during formation of the foam board 400. The main body 522 functions as a barrier between the foam material and the Aerogel material as described herein. The foam board 400 may have an R value per inch of at least 8.0 or at least 8.5. The foam board 400 may have a ratio of foam material to Aerogel (or Aerogel and carbon black) of between 5 and 8, and commonly about 6.5.

Figure 7A:
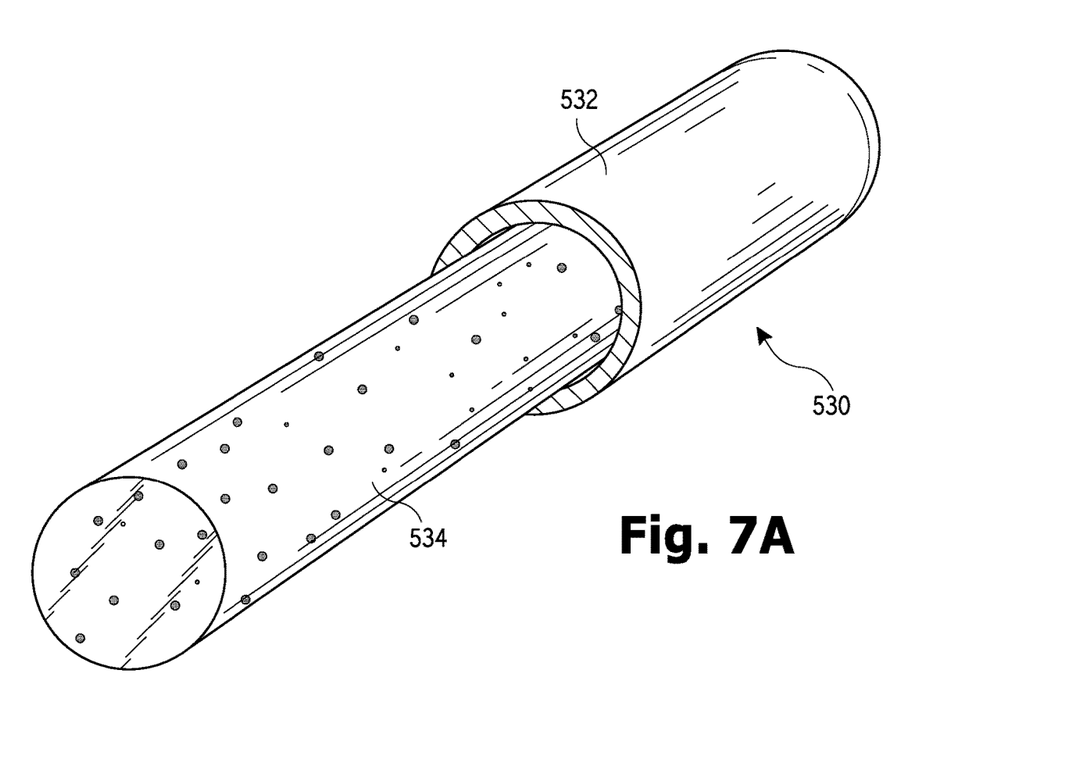
FIG. 7A illustrates an Aerogel rod.
Figure 7B:
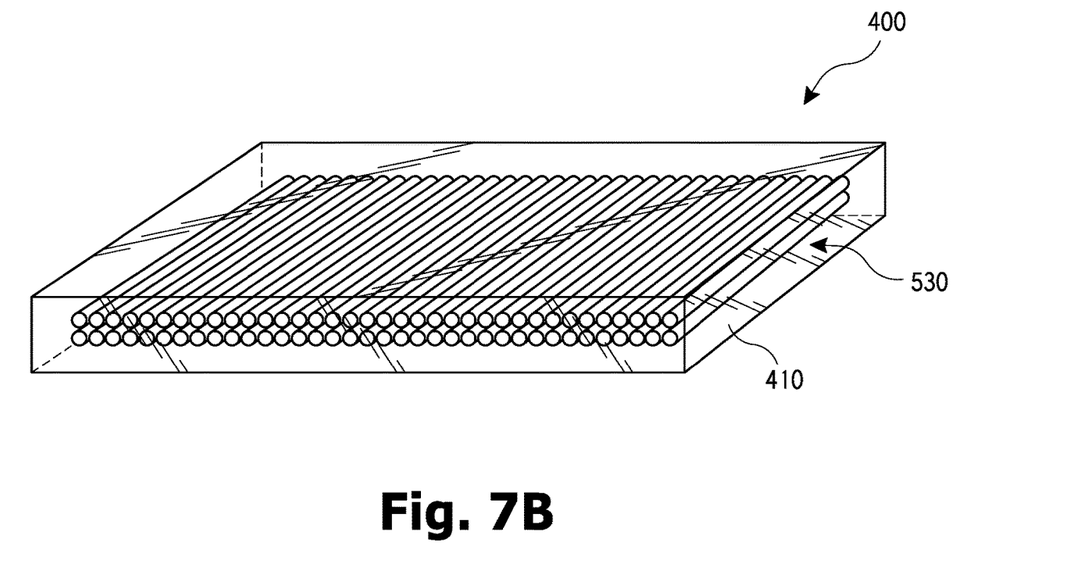
FIG. 7B illustrates the Aerogel rod of FIG. 7A disposed within a foam core of a foam construction product.

FIG. 7A illustrates an Aerogel rod 530 that may be used in place of, or in addition to, the polymer envelopes or sheets described above. The Aerogel rod 530 may be cylindrical in shape as illustrated or may have another shape, such as rectangular, triangular, octagonal, and the like. The Aerogel rod 530 includes an Aerogel material 534 that is encased or enclosed within a polymer film outer layer or material 532. The Aerogel material 534 may be a relatively solid material, such as that illustrated in FIG. 2, or may be formed of an aggregation, mass, or collection 100 of Aerogel particles 102. The Aerogel material 534 may also include carbon black as described herein. The polymer outer layer 532 encases the Aerogel material 534 and functions as a barrier between the foam material and the Aerogel material as described herein. The Aerogel material 534 may be vacuum sealed within the polymer outer layer 532 if desired, although in other embodiments a vacuum is not applied to the Aerogel material 534 and polymer outer layer 532. FIG. 7B illustrates a plurality of Aerogel rods 530 disposed within the foam core 410 of the foam board 400. The Aerogel rods 530 may be aligned and/or stacked atop one another as illustrated, or may have any other configuration within the foam core 410. The use of the Aerogel rods 530 may enable the Aerogel material to be more easily positioned within the interior of the foam board 400 since the Aerogel rods 530 may be pressed into the foam material during formation of the foam board 400. The foam board 400 may have an R value per inch of at least 8.0 or at least 8.5. The foam board 400 may have a ratio of foam material to Aerogel (or Aerogel and carbon black) of between 5 and 8, and commonly about 6.5.

Figure 8A:
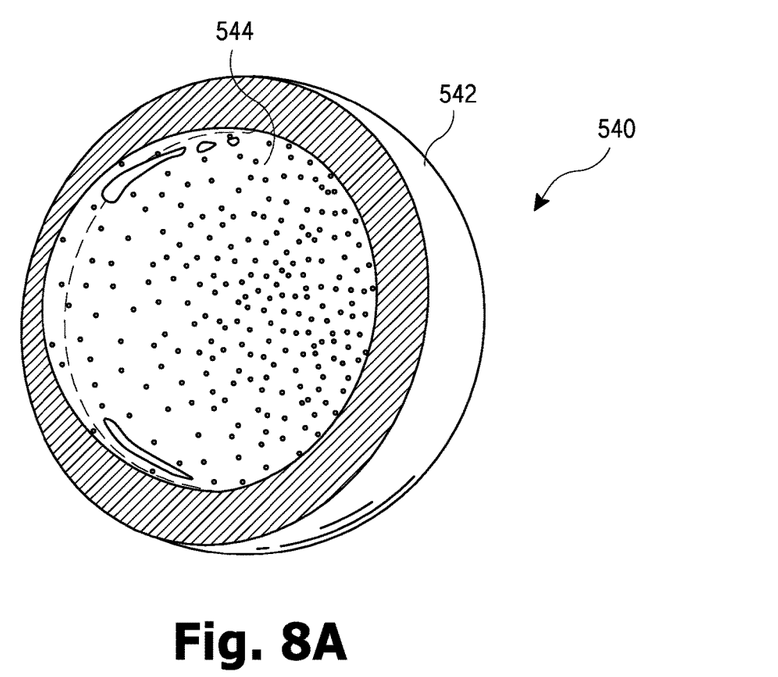
FIG. 8A illustrates an Aerogel capsule.
Figure 8B:
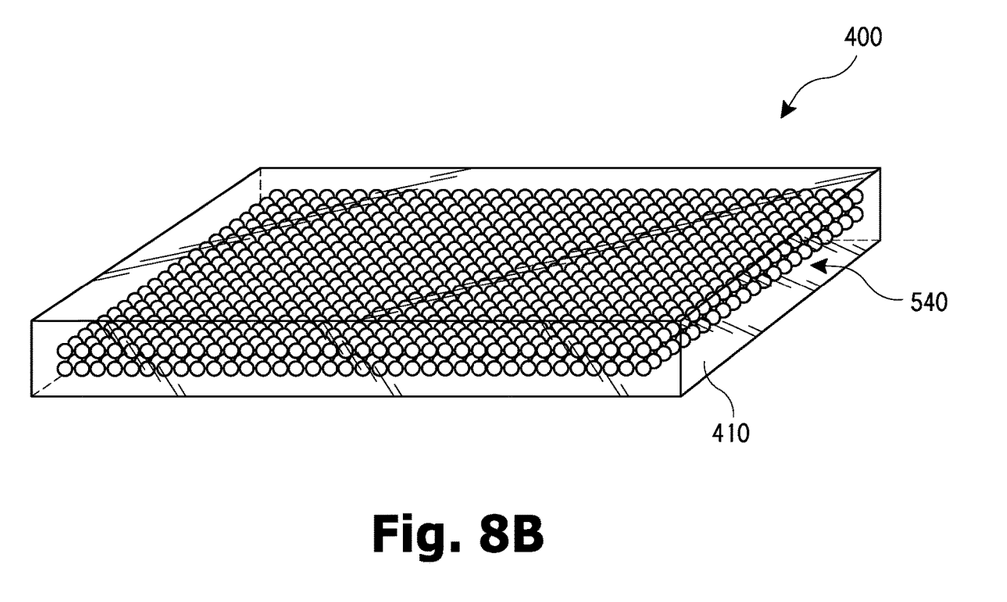
FIG. 8B illustrates the Aerogel capsule of FIG. 8A disposed within a foam core of a foam construction product.

FIG. 8A illustrates an Aerogel capsule 540 that may be used in place of, or in addition to, the polymer envelopes or sheets described above. The Aerogel capsule 540 may be spherical in shape as illustrated or may have another shape, such as cubic, triangular, cylindrical, or a random shape. The Aerogel capsule 540 includes an Aerogel material 544 that is encased or enclosed within a polymer outer layer or material 542. The Aerogel material 544 may be a relatively solid material, such as that illustrated in FIG. 2, or may be formed of an aggregation, mass, or collection 100 of Aerogel particles 102. The Aerogel material 544 may also include carbon black as described herein. The polymer outer layer 542 encases the Aerogel material 544 and functions as a barrier between the foam material and the Aerogel material as described herein. The Aerogel material 544 may be vacuum sealed within the polymer outer layer 542 if desired, although a vacuum is not typically applied to the Aerogel material 544 and polymer outer layer 542. FIG. 8B illustrates a plurality of Aerogel capsule 540 disposed within the foam core 410 of the foam board 400. The Aerogel capsule 540 may be aligned and/or stacked atop one another as illustrated, or may have any other configuration within the foam core 410. In one embodiment, the Aerogel capsules 540 are homogenously or uniformly dispersed within the foam core 410. The use of the Aerogel capsule 540 may enable the Aerogel material to be more easily positioned within the interior of the foam board 400 since the Aerogel capsule 540 are relatively small and easy to disperse within the foam material during formation of the foam board 400. The foam board 400 may have an R value per inch of at least 8.0 or at least 8.5. The foam board 400 may have a ratio of foam material to Aerogel (or Aerogel and carbon black) of between 5 and 8, and commonly about 6.5.

An exemplary foam board was constructed with a polymer envelope disposed within the interior of the foam board. The polymer envelope had a thickness of approximately 0.3 inch and included Aerogel particles having a size range between 0.3 and 3.0 mm, a mean pore diameter of less than or equal to 20 nm, a bulk density of between 0.03 and 0.3 g/cm$^3$, and a surface area of between 600 and 1000 m$^2$/g. The Aerogel particles were enclosed in a flexible gas impermeable pack (i.e., polymer envelope) and a slight vacuum (i.e., less than 50 kPa) was applied to the pack, which hardened the pack into a relatively rigid shape. The flexible gas impermeable pack was positioned within a 1 inch thick foam board and an R-value of approximately 8.52 R/inch was measured. The density of the resulting board was approximately 5.74 pounds per cubic foot (pcf).

Exemplary Method

Figure 9:
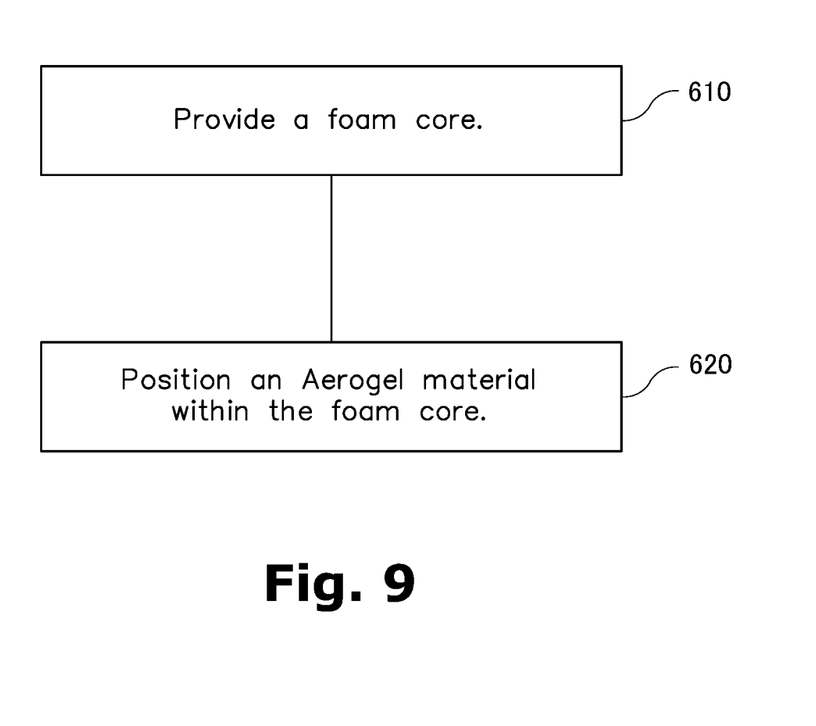
FIG. 9 illustrates a method of forming a construction product with improved insulative properties.

FIG. 9 illustrates a method of forming a construction product with improved insulative properties. At block 610, a foam core is provided. The foam core includes polyurethane foam and more commonly polyisocyanurate foam. At block 620, an Aerogel material is positioned within the foam core. As described herein, the Aerogel may be used in isolation if desired, but block 620 more commonly includes positioning a mixture of Aerogel and carbon black within the foam core. In such embodiments, the mixture of the two materials includes between 90 and 99 weight percent of the Aerogel and between 1 and 10 weight percent of the carbon black.

The Aerogel or Aerogel/carbon black mixture is added so that the foam core includes between 10 and 90 percent by volume of the Aerogel or Aerogel/carbon black mixture. In other embodiments, the Aerogel or Aerogel/carbon black mixture is added so that the foam core includes between 30 and 90 percent by volume of the Aerogel or Aerogel/carbon black mixture or between 50 and 90 percent by volume of the Aerogel or Aerogel/carbon black mixture. The resulting construction product has or exhibits an R-value of at least 8.0 R/inch, a flame spread index of no greater than 30, and a smoke development index of no greater than 300 as measured according to ASTM E-84 test.

In some embodiments, the method includes separating the Aerogel or Aerogel/carbon black mixture from the polyurethane foam via a barrier material so that the polyurethane foam does not directly contact the Aerogel or Aerogel/carbon black mixture. In such embodiments, the Aerogel or Aerogel/carbon black mixture may be enclosed, encased, or otherwise positioned within the barrier material in order to separate the Aerogel or Aerogel/carbon black mixture from the polyurethane foam. In such instances, the barrier material is entirely surrounded by the polyurethane foam when positioned within the foam core. In some embodiments, the Aerogel or Aerogel/carbon black mixture may be vacuum sealed within the barrier material. The enclosed Aerogel or Aerogel/carbon black mixture may form capsules or pouches. In such instances, the method may further include positioning a plurality of capsules or pouches within the foam core.

In some embodiments, positioning the Aerogel or Aerogel/carbon black mixture within the foam core is accomplished by pouring liquid polyurethane foam around the Aerogel or Aerogel/carbon black mixture so that the liquid polyurethane foam entirely surrounds the Aerogel or Aerogel/carbon black mixture. The liquid polyurethane foam is then allowed to dry and harden. In other embodiments, positioning the Aerogel or Aerogel/carbon black mixture within the foam core is accomplished by positioning the Aerogel or Aerogel/carbon black mixture between two preformed polyurethane foam boards and coupling the boards together.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A polyurethane foam based construction product having improved insulative properties, the construction product comprising:
    a foam core comprising polyurethane foam; and
    a mixture of Aerogel and carbon black disposed within the foam core; wherein:
        the mixture of Aerogel and carbon black is enclosed within a barrier material such that the polyurethane foam does not directly contact the Aerogel and carbon black; and
        the barrier material is entirely surrounded by the polyurethane foam so that the barrier material is fully enclosed within the foam core.

2. The polyurethane foam based construction product of claim 1, wherein the Aerogel and carbon black are vacuum sealed within the barrier material.

3. The polyurethane foam based construction product of claim 1, wherein the barrier material has a thickness of between 0.2 and 0.4 inches.

4. The polyurethane foam based construction product of claim 3, wherein the construction product has a thickness of 1 inch.

5. The polyurethane foam based construction product of claim 1, wherein the foam core includes a ratio of polyurethane foam to the mixture of Aerogel and carbon black of between 1.5 and 10.5.

6. The polyurethane foam based construction product of claim 1, wherein the polyurethane foam based construction product includes between 10 and 90 percent by volume of the mixture of Aerogel and carbon black.

7. The polyurethane foam based construction product of claim 1, wherein the barrier material forms a capsule or pouch and wherein the polyurethane foam based construction product includes a plurality of such capsules or pouches.

8. The polyurethane foam based construction product of claim 1, wherein the polyurethane foam is polyisocyanurate foam.

9. The polyurethane foam based construction product of claim 1, wherein:
    the polyurethane foam based construction product has an R-value of at least 8.0 per inch; and
    the polyurethane foam based construction product has a flame spread index of at most 30 and a smoke development index of at most 300 as measured according to ASTM E-84 test.

10. The polyurethane foam based construction product of claim 1, wherein the mixture of Aerogel and carbon black comprises:
    between 90 and 99 weight percent Aerogel; and
    between 1 and 10 weight percent carbon black.

11. An insulative construction product comprising:
    a foam core comprising a foam material; and
    an Aerogel mixture disposed within the foam core; wherein:
        the insulative construction product includes between 10 and 90 percent by volume of the Aerogel mixture;
        the Aerogel mixture is contained within a barrier material that is entirely surrounded by the foam material so that the barrier material is fully enclosed within the foam core; and
        the barrier material prevents direct contact between the foam material and the Aerogel mixture.

12. The construction product of claim 11, wherein the Aerogel mixture comprises Aerogel and carbon black.

13. The construction product of claim 12, wherein the Aerogel mixture comprises:
    between 90 and 99 weight percent of the Aerogel; and
    between 1 and 10 weight percent of the carbon black.

14. The construction product of claim 11, wherein the barrier material is vacuum sealed.

15. The construction product of claim 14, wherein the barrier material forms a capsule or pouch and wherein the construction product includes a plurality of capsules or pouches.

16. The construction product of claim 11, wherein the foam material comprises polyurethane foam.

17. The construction product of claim 16, wherein the polyurethane foam comprises polyisocyanurate foam.

18. The construction product of claim 11, wherein construction product includes a ratio of foam material to Aerogel mixture of between 1.5 and 10.5.

19. A method of forming a construction product with improved insulative properties, the method comprising:
    providing a foam core comprising foam material;
    positioning an Aerogel mixture within the foam core;
    separating the Aerogel mixture from the foam material via a barrier material so that the foam material does not directly contact the Aerogel mixture and so that the barrier material is fully enclosed within the foam core;
    wherein the foam core includes between 10 and 90 percent by volume of the Aerogel mixture.

20. The method of claim 19, further comprising vacuum sealing the barrier material.

21. The method of claim 19, wherein the barrier material forms a capsule or pouch and wherein the method further comprises positioning a plurality of capsules or pouches within the foam core.

22. The method of claim 19, wherein positioning the Aerogel mixture within the foam core comprises:
    pouring liquid foam around the Aerogel mixture so that the liquid foam entirely surrounds the Aerogel mixture; and
    allowing the liquid foam to harden.

23. The method of claim 19, wherein the foam material in the foam core is polyisocyanurate foam.

24. The method of claim 19, wherein Aerogel mixture comprises:
    between 90 and 99 weight percent Aerogel; and
    between 1 and 10 weight percent carbon black.

* * * * *